United States Patent [19]

Laing

[11] Patent Number: 4,469,311
[45] Date of Patent: Sep. 4, 1984

[54] MOTORIZED HAND TORCH

[75] Inventor: David A. Laing, Willoughby, Ohio

[73] Assignee: Victor Equipment Company, Denton, Tex.

[21] Appl. No.: 557,845

[22] Filed: Dec. 5, 1983

[51] Int. Cl.³ .............................. B23K 7/02; B23K 7/10
[52] U.S. Cl. ......................................... 266/67; 266/70; 266/77
[58] Field of Search ........................ 266/48, 67, 70, 77

[56] References Cited

U.S. PATENT DOCUMENTS

| | | | |
|---|---|---|---|
| 3,170,015 | 2/1965 | Ziebart | 266/70 |
| 3,514,087 | 5/1970 | Richards | 266/70 |
| 4,021,025 | 5/1977 | Frame | 266/70 |
| 4,283,043 | 8/1981 | Kalian | 266/70 |
| 4,405,117 | 9/1983 | Ohlaug | 266/77 |

*Primary Examiner*—W. Stallard
*Attorney, Agent, or Firm*—Wofford, Fails & Zobal

[57] ABSTRACT

A semi-automatic, motorized hand torch, or gas cutting machine, that is capable of being freely operated with one hand and characterized by device head having a cutting torch tip, respective conduit means for supplying to the tip preheat oxygen, cutting oxygen and fuel gas, a drive cylinder journalled for rotation about the tip, a drive wheel engaging the peripherally outer cylindrical wall of the drive cylinder so as to be driven thereby and moveable longitudinally therealong so as allow adjustment in height of the tip, a motor and transmission drivingly connected with a drive cylinder, control for controlling the motor, housing and bracket for supporting the drive wheel adjacent the tip. Also disclosed are specific preferred embodiments including those in which respective small and large circle cutting attachments are employed and wherein an angled cutting wheel and strut are employed for cutting at an angle, as well as specific preferred structure.

9 Claims, 11 Drawing Figures

MOTORIZED HAND TORCH

FIELD OF THE INVENTION

This invention relates to semi-automatic gas cutting machines that can be operated easily with one hand. More particularly, this invention relates to gas cutting machines which enables cutting through steel plate or the like, the cutting being at an angle or in large or small circles, as desired; yet easily operable with one hand by the operator because of the traveling support of the torch.

DESCRIPTION OF THE PRIOR ART

The prior art has seen the development of a wide variety of approaches to heating and cutting torches. It has included small hand held torches and machine torches and even elaborate travelling torches.

Illustrative of these types of torches are those disclosed in U.S. Pat. Nos. 3,540,263; 3,619,301 and 4,014,528 wherein the free end of the torch was mounted on a wheeled structure. In a patent, U.S. Pat. No. 4,327,898, by co-workers and assigned to the assignee of this invention, there were disclosed an excellent travelling torch for traversing along a track or the like to make a desired cut. In that patent, a variety of the prior art type torches including wheeled carriages carrying the torch, remote clutch levers and the like and their problems were disclosed.

In that application there was disclosed the desirable features for a fully mobile travelling torch that did not require an operator to hold one end of the torch.

Frequently, however, less elaborate semi-automatic gas cutting torches are needed. Particularly desirable in those instances are motorized hand torches that can be employed with one hand; that are capable of being used in narrow space; that are capable of simple transportation and treatment; that are capable of obtaining a high degree of accuracy; that are capable of producing economically a wide variety of cuts and a variety of angles, in circles or the like with a single mode that allows controlling the height even when cutting at angles.

From the foregoing it can be seen that the prior art has provided a wide variety of approaches including the fully mounted torches and the semi-automatic gas cutting machines that do not have height adjustments for being maintained at a desired height with a given set of attachments when cutting at an angle or the like.

SUMMARY OF THE INVENTION

Accordingly, it is an object of this invention to provide a semi-automatic motorized hand torch, or gas cutting machine, that has one or more of the features delineated hereinbefore as desirable but not heretofore provided by the prior art.

It is another object of this invention to provide a motorized hand torch that has substantially all of the features delineated hereinbefore as desirable but not heretofore provided by the prior art.

These and other objects will become apparent from the descriptive matter hereinafter, particularly when taken into conjunction with the appended drawings.

In accordance with this invention, there is provided a a gas cutting machine for cutting steel plate or the like comprising:

(a) a device head having a cutting torch tip;

(b) respective conduit means for supplying to the tip, respectively, preheat oxygen, cutting oxygen and fuel gas;

(c) a drive cylinder journalled for rotation about the tip;

(d) a drive wheel engaging the peripherally outer cylindrical wall of the drive cylinder so as to be driven thereby and moveable longitudinally therealong so as to allow adjustment in height of the tip with respect to the steel plate to allow cutting at a desired angle;

(e) a motor;

(f) a power transmission means connected with the motor and drivingly connected with the drive cylinder so as to drive the cylinder responsive to the motor;

(g) control means for controlling the motor; and (h) bracket for supporting the drive wheel adjacent the tip; the bracket being pivotally connected with said housing and rotatable through 360° about said tip such that said wheel or another attachment can be moved about said tip. In a preferred embodiment, there is provided a housing covering the device head, motor and power transmission means.

As will become clearly apparent from the descriptive matter later hereinafter, specific preferred embodiments include embodiments allowing cutting at a desired angle with adjustable tip height; and embodiments allowing cutting in large or small circles.

DESCRIPTION OF THE PREFERRED EMBODIMENT(S)

Figures 1, 10:
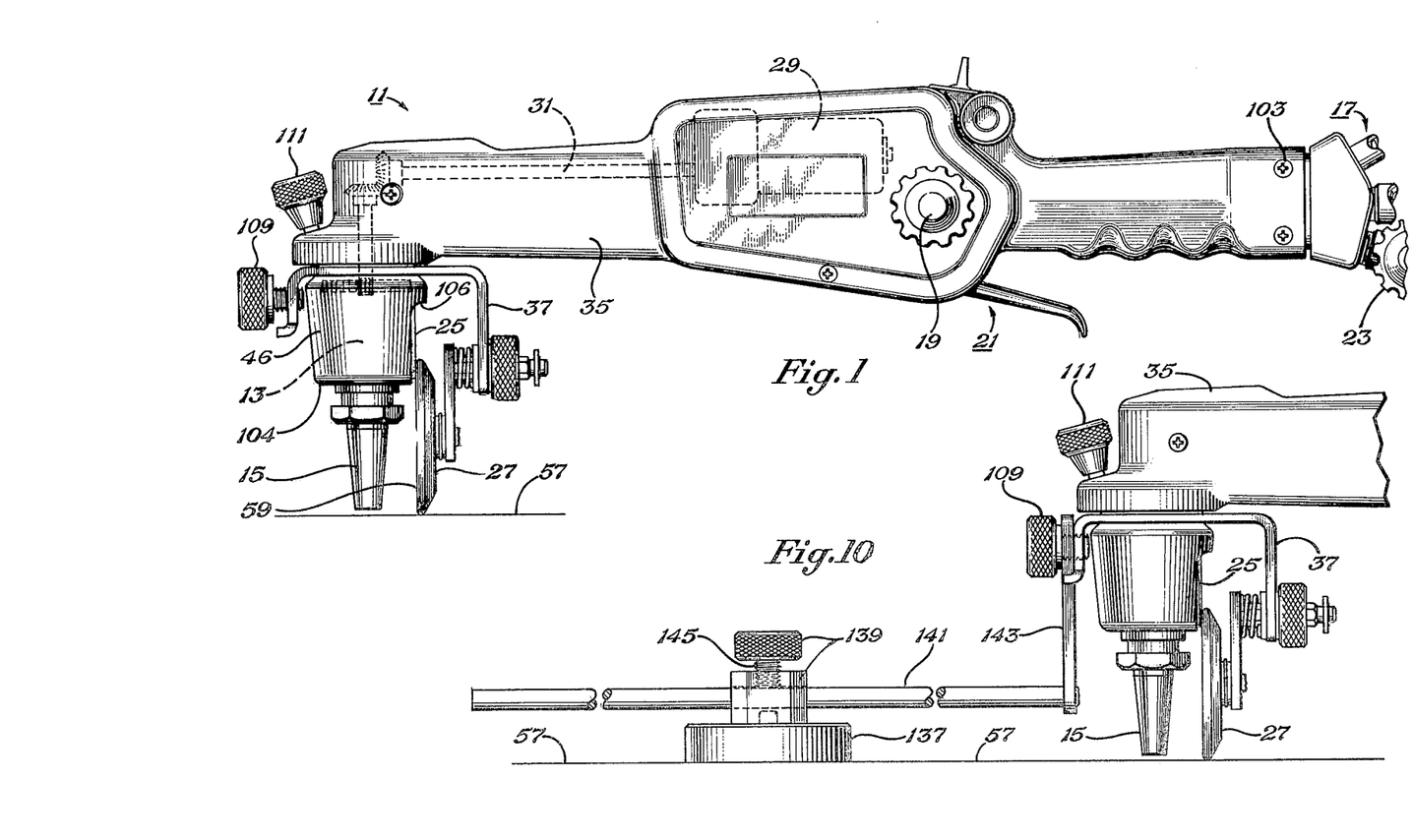
FIG. 1 is a side elevation view of one embodiment of this invention.
FIG. 10 is a partial side elevational view of a large circle cutting attachment for the embodiment of FIG. 1.
Figures 2, 3, 4:
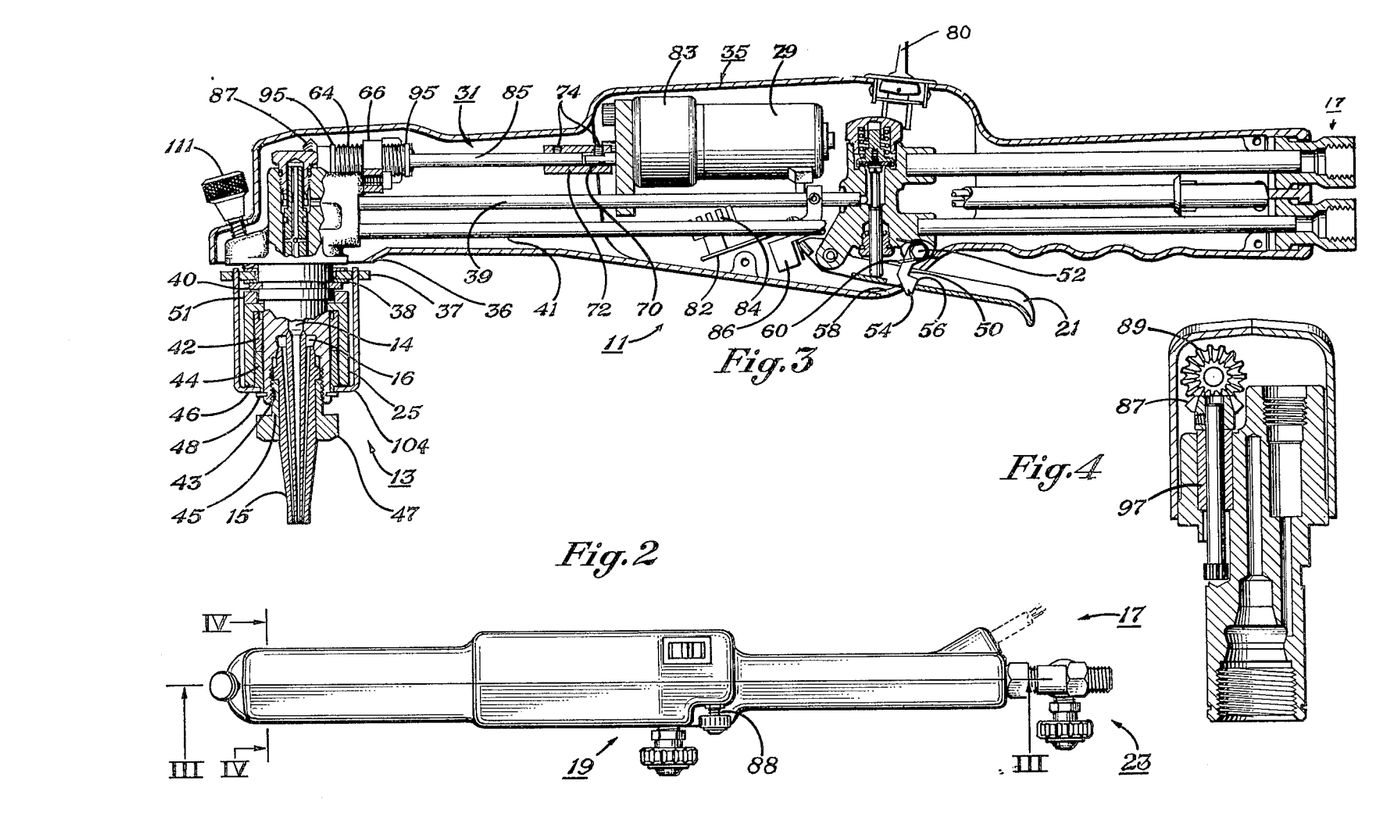
FIG. 2 is a top view of the embodiment of FIG. 1, also showing fuel and oxygen connections and integral control and check valve.
FIG. 3 is a partial cross-sectional view taken along the line III—III, FIG. 2.
FIG. 4 is a partial cross-sectional view taken along the line IV—IV, FIG. 2.

Referring to the drawings, the gas cutting machine, or motorized hand torch 11, FIGS. 1-3, includes a device head 13 having a cutting torch tip 15. Respective conduit means 17 supply to the tip, respectively, preheat oxygen, cutting oxygen and fuel gas. Control is afforded by preheat oxygen valve 19, cutting oxygen valve and handle 21 and fuel valve 23. The motorized hand torch 11 also includes a drive cylinder 25 journalled for rotation about the tip 15; a drive wheel 27 engaging the peripherally outer cylindrical wall of the drive cylinder so as to be driven thereby and moveable longitudinally therealong so as to allow height adjustment of the tip with respect to the steel plate to allow cutting at a desired angle; a motor 29, dashed lines FIG. 1 and FIGS. 3 and 6; and power transmission means 31 connected with the motor 29 and with the drive cylinder 25. The motorized hand torch 11 also includes a standard type control means, illustrated by control plate 33, FIG. 6 that is connected with and provided for controlling the motor 29. Ordinarily, the control means may be employed on the torch or as a separate remote unit as desired. Standard type of control means such as claimed in U.S. Pat. No. 4,014,528, may be employed herein. Housing 35, FIG. 1, covers the motor, power transmission means and most of the head. Motorized hand torch 11 also includes a bracket 37, FIGS. 1–5, 6 and 10 for supporting the drive wheel adjacent the tip.

Figure 5:
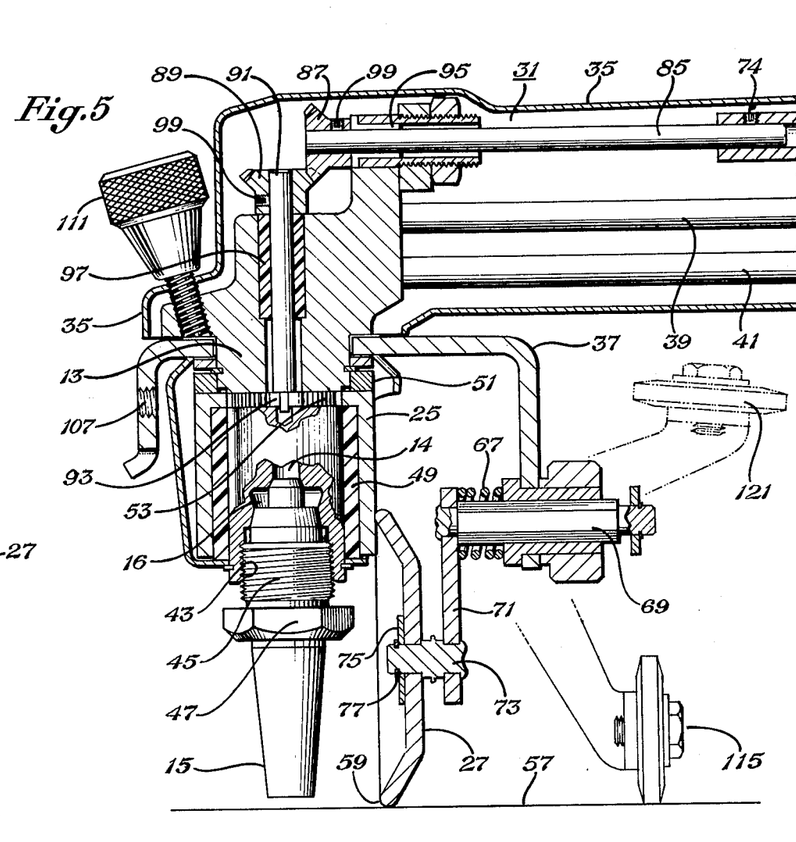
FIG. 5 is a partial cross-sectional view, partly schematic, of the embodiment of FIG. 1, showing the inclusion of an angle cutting wheel and strut in both the operational and stowed position.

The head 13 may comprise any of the fairly conventional heads. As can be seen in FIGS. 3 and 5, the head 13 is joined at one end to a plurality of conduits 39, 41 carrying the fuel-oxygen mixture and the cutting oxygen for operation of the cutting torch. The device head 13 is included within the casing 35. It has a plurality of conventional passageways (not shown) for conveying, respectively, the fuel-oxygen mixture for preheat and the cutting oxygen to the tip 15. In accordance with the usual design, a threaded aperture 43 is provided for receiving a bushing 45 having hex nut 47 and holding the tip 15, FIGS. 3 and 5. Of course almost any structure could be employed that is compatible with the other elements described hereafter. As illustrated in FIGS. 3 and 5, the head 13 is cut away at a plurality of different points to illustrate the central aperture 14 for cutting oxygen and the annular space 16 for the fuel-air mixture.

The most detailed illustration of the head and surrounding accessories is shown in FIG. 3. Therein, the mounting bracket 37 is illustrated just below the bottom 36 of the housing 35 adjacent the tip 15. There is also illustrated bearing 38, retaining ring 40, bearing 51, as well as the upper and lower bearings 42 and 44 for supporting the cylinder 25. There is also illustrated the drive cover 46 and its retaining ring 48.

The tip 15 comprises a conventional type cutting tip. Any of the gas cutting nozzles conventionally employed may be employed as the tip 15. Ordinarily, the conventional cutting tip 15, as illustrated in FIG. 3, will have a central aperture for discharging cutting oxygen with a plurality of passageways disposed about the central passageway for the mixture of preheat fuel and oxygen. The preheat fuel and oxygen will be supplied part way through separate individual conduits and finally admixed just before being admitted to the tip 15 to minimize the possibility of flashback, burnback, explosion or the like. Frequently flashback prevention means; such as, tortious passageways, spiral copper heat dissipators and the like; are employed to prevent flashback. The nature of the tip 15 is not critical to this invention. It is only necessary that the tip properly use the gases supplied by the respective conduits to effect the desired cutting.

The conduits 17 may comprise any of the conventionally employed conduits in this art. Conventionally they will range from flexible hoses between the torch and the high pressure containers for the respective oxygen fuel gas to torch internal passageways, including tubing of stainless steel, copper or copper alloy. The conduits coengage with respective portions of the body and head; for example, conduits 39 and 41 engaging the head 13 in FIGS. 3 and 5, the respective portions of the body of the torch including means for encompassing the respective valves that are employed for controlling the preheat oxygen, cutting oxygen and fuel.

The preheat oxygen valve 19, cutting oxygen valve 21 and the fuel valve 23 are the same types of valves that are ordinarily employed in this art and do not require special, exotic or expensive types of valves or exotic types of materials. As can be seen, the preheat oxygen valve and the fuel valve 23 employ conventional knurled knob, or handle, so that they can be readily operated with one hand while the torch is being held in the other for initial ignition or adjustment of preheat flame. The cutting oxygen valve and handle 21 are conventional and respond to movement of the handle with a finger on the hand manipulating the torch, all in accordance with conventional type operation that need not be described in detail herein. As illustrated in FIG. 3, however, there is provided a locking lever 50 that is pivotally mounted for movement around trigger lock 52. The locking lever 50 has a head 54 with a shoulder 56 for extending through the slot 58 and locking the lever when the lever is pulled high enough. The reason the shoulder will engage the bottom of the lever 21 is that the biasing spring 60 provides torque to move the lever counterclockwise in the illustrated embodiment. Accordingly, the shoulder 56 will engage the bottom of the lever 21 when the lever 21 is raised high enough. The locking lever can be released by pushing forwardly on the head 54 with the finger holding the lever 21. This allows the locking lever to be released without a zig-zag in the cut. Prior art locking levers were applied from the side and caused a zig-zag in the cut when they were released.

Figure 6:
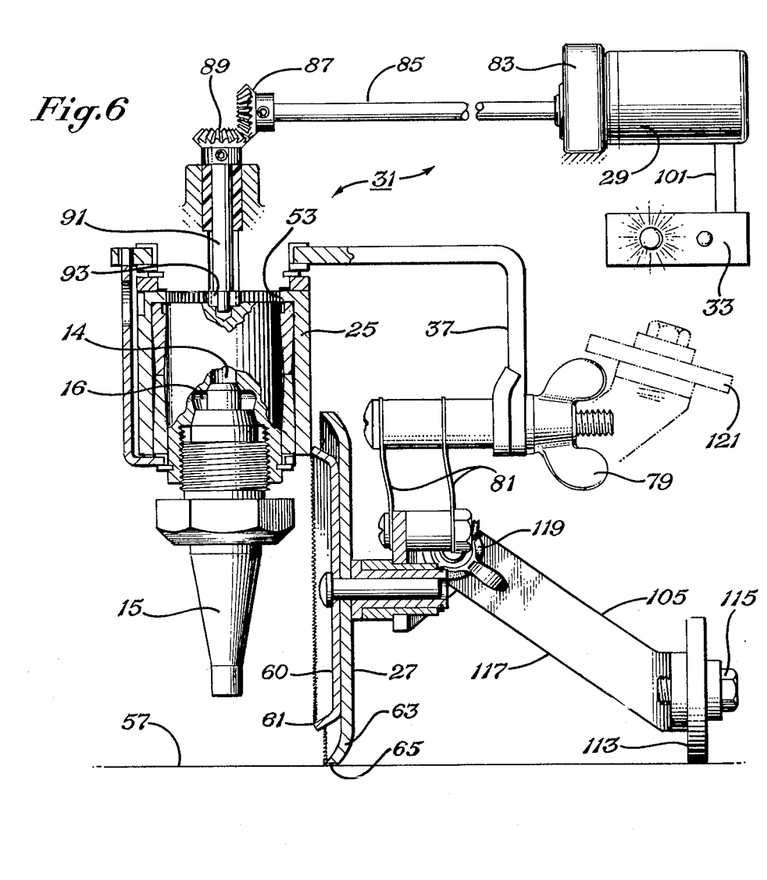
FIG. 6 is a partial cross-sectional, partly diagrammatic view of another embodiment to that of FIG. 5 showing the angle cutting strut and wheel.

The drive cylinder 25 is journalled for rotation about the tip 15 through mounting bushings 49 and bearings 51 FIGS. 3 and 5. As can be seen in FIGS. 1, 5 and 6, the drive cylinder 25 has appreciable height for movement of the drive wheel 27 longitudinally therealong. The drive cylinder 25 has an internal gear 53, FIGS. 5, 6 and 8. The drive cylinder 25 may be formed of any material that has adequate structural strength, but is preferably machined from hardenable steel to give reasonable life to the external serrations 25 described below.

Figure 8:
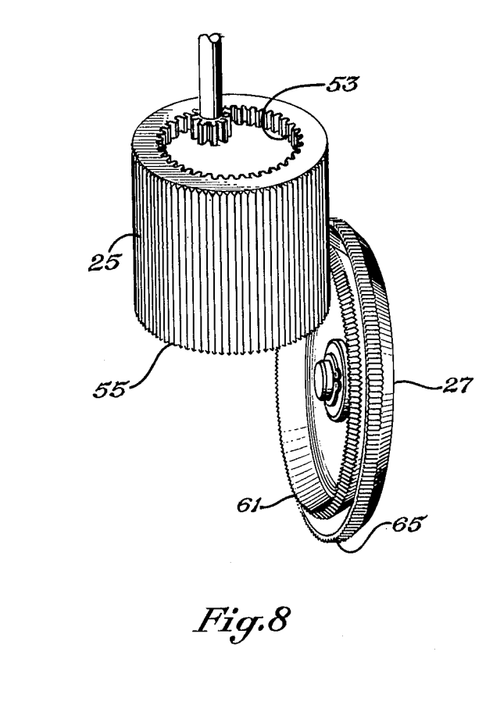
FIG. 8 is a partial diagrammatic view of one embodiment of the drive cylinder and drive wheel having serrations for greater traction.

In some embodiments such as illustrated in FIG. 8, the drive cylinder 25 may have serrations 55 along its peripheral outer wall for driving the drive wheel 27 with greater tractive force. The serrations traverse longitudinally of the cylindrical surface, however, in order to allow the drive wheel 27 to move upwardly and downwardly therealong.

The drive wheel 27 engages the peripherally outer wall of the drive cylinder 25 so as to be driven thereby and is moveable longitudinally therealong so as to allow adjustment in height of the tip 25 with respect to the steel plate 57, FIG. 1, to allow cutting at desired angle. The drive wheel 27 may taken any of a variety of satisfactory forms. As illustrated, it is a dished wheel such that the edge 59, FIGS. 1, 5 and 10 can bear against the outer wall of the cylinder 25. As illustrated in FIGS. 6 and 8, the wheel 27 may comprise a two part wheel with an inner section 60 having its radial exterior 61 engaging the cylinder 25 while an outer section 63 has its outer edge 65 engaging the surface of the steel plate. As can be seen the two outer edges 61 and 65 of the inner and outer sections of the wheel 27 have serrations for engaging their respective surfaces with greater tractive force. Again the wheel 27 can be made of any material having the desired structural strength. Because of the edgewise engagement with both the cylinder 25 and the surface of the steel plate, metal is preferred.

Figure 11:
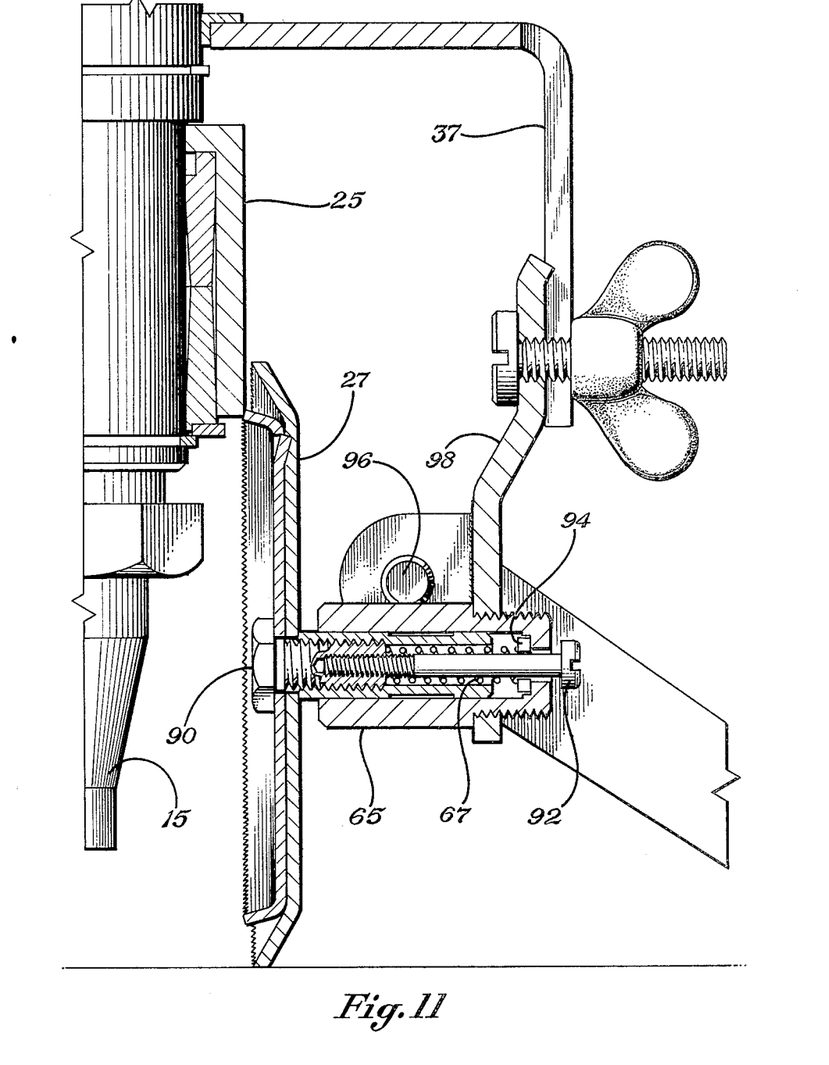
FIG. 11 is a partial cross-sectional view of another embodiment of this invention, similar to FIGS. 5 and 6.

The wheel 27 is preferably mounted with a biasing means biasing its edge 59 toward the cylinder 25. As illustrated in FIG. 5, the biasing may take the form of a coiled spring 67 properly biasing a longitudinally moveable hexagonal shaft 69 carrying the wheel toward the cylinder 25. Specifically, the shaft 69 carries a member 71 and the shaft 73 on which is journalled the wheel 27, as by a washer 75 and C-clamp 77. On the other hand, a wing nut 79 may be employed as illustrated in FIG. 6 to hold a pair of leaf springs 81 on the bracket 37 to bias the wheel 27 to engagement with the cylinder 25. Another approach is illustrated in FIG. 11 which is similar to that of FIG. 5. Therein, the hexagonal shaft 65 is held in firm engagement with the wheel 27 by way of nut and bolt 90. In this embodiment, the spring 67 is coiled around screw shaft 92 and biases from the base washer 94 carried by the pivotal mounting 96 on the arm 98 carried by the bracket 37. Thus the wheel 27 frictionally engages the side of the drive cylinder 25 and is biased so by the spring 67.

The motorized hand torch 11 includes the motor 29 which may comprise any of the conventional types of motors for the art in which the torch is being employed. Ordinarily, the electric motor will be satisfactory, although pneumatic motors or even hydraulic motors could be employed if necessary in certain environments. As illustrated, the motor 29 is an electric motor so as to be easily controlled by its control means and deliver power by way of the transmission means 31.

The power transmission means 31 includes a gear reducer 83, FIGS. 3-6, for reducing the speed of the output shaft 85, also referred to herein as a lateral shaft. The lateral shaft 85 terminates in a connected beveled gear 87, which engages bevel gear 89; which, in turn, is fixedly connected with a vertical shaft 91, extending longitudinally of the head. At the other end of the longitudinal shaft and fixedly connected therewith is a gear 93 that coengages the gear teeth 53 on the cylinder 25. The respective lateral and longitudinal shafts 85 and 91 are journalled for rotation within respective bushings 95, 97. In fact, as can be seen in FIG. 3, the lateral shaft 85 has an adjusting sleeve 64 that is threadedly mounted in back plate 66 so as to be able to adjust the backlash of the respective engagement of the gear of the bevel gears 87, 89. The shaft 85 is held fixedly engaged with a shaft 70 by a sleeve coupling 72 with set screw 74. Other ways could be employed to maintain engagement between the respective shafts. Similarly, the respective gears may be affixed to the respective shafts by any suitable means, although set screws such as set screw 99 are illustrated as the preferred method. It is readily apparent that pins and slots may be employed if desired. The Allen type set screws work satisfactorily, however, and transmit adequate torque from the motor responsive to the control means 33.

The control means 33 is shown by simple switch and rheostat plate 33 and interconnecting conductors 101. Again, the control means can take any form desired and can be located as desired. Preferably, they are located near or on the torch so as to be operable by the operator. Once a desired speed is attained for particular thickness steel plate, the operator may choose to simply flick the switch on and off rather than operate the rheostat. As illustrated in FIG. 3, the control means 33 incorporates a rocker switch 80 having forward, stop and reverse positions for controlling the direction of movement of the torch; as well as speed control 82 having heat dissipating fins 84. The terminology speed control is a bit misleading since the rheostat actually controls the speed whereas the switch 82 simply serves as an on/off switch for energizing the motor 29 when the lever 21 is raised upwardly to turn on cutting oxygen. Turning on and off is accomplished by microswitch 86 having its leaf depressed by the extended end of lever 21. The speed is set by potentiometer 88, the rocker switch sets the direction and the trigger microswitch turns on the motor responsive to movement of the handle 21 of the cutting oxygen valve. The control means 33 incorporates elements that are preferably located closely to and even on the housing 35.

The housing 35 may take any form desired to give the desired appearance to the torch and protect certain elements from abuse, spattered metal, heat and the like. As illustrated, the housing 35 is formed in two parts. The housing may be held together by any means. As illustrated, Phillips head screws 103, FIG. 1 are employed to help hold the housings together. Near the tip 15 the housing provides a raceway that accomodates and a lower part 104 of the drive cover 46, FIG. 1, that rotates with movement of the bracket 37 through 360°. The lower part 104 keeps a slot 106 properly oriented so as to keep the wheel 27 engaging the cylinder 25 regardless of the angle of the bracket 37.

The bracket 37 is connected to the housing and supports the drive wheel adjacent the tip. The bracket is adapted to be affixed such that the drive wheel can drive in either straight line or to be loose so to allow rotating the full 360° circle about the tip for freedom of cutting circles or the like. As illustrated, the bracket 37 has an aperture and means on one side for connecting drive wheel 27 and an angle wheel and strut 105, FIG. 6. At the opposite side of the bracket, there is provided a means such as threaded aperture 107, FIG. 5 and knurled-headed bolt, or screw, 109, FIG.1, for attachment of auxiliary circle cutting apparatus as will be described hereinafter. A retention thumbscrew 111, FIGS. 1, 3 and 5, is provided for retaining the bracket in a predetermined position, as for traversing along a straight line; and for being moved upwardly out of engagement with the bracket to allow the bracket to rotate through 360°.

Figure 7:
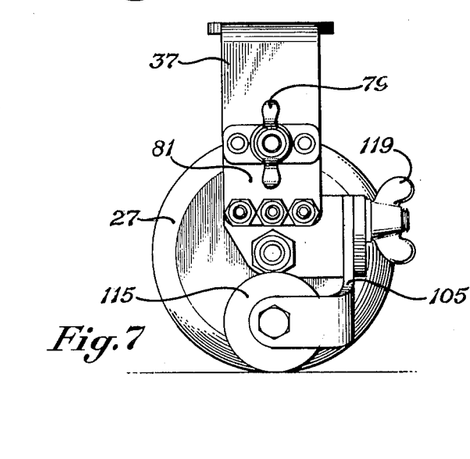
FIG. 7 is a side elevational view of the drive wheel and bracket of FIG. 6.

As can be seen more clearly in FIGS. 6 and 7, the angle cutting wheel and strut 105 is included to allow inclining the tip at a desired angle and obtaining the desired height with respect to the steel plate 57. Specifically, the angle cutting wheel and strut comprises a second wheel 113 that is journalled for rotation about the bolt shaft 115. The angled strut 117 supports the second wheel 113 and is connected at its other end with an adjustable bracket in the form of friction wing nut 119 such that the second wheel 113 can be swung into a stored position, illustrated by the ghost lines 121. As will be apparent, the wing nut 119 can be loosened and the strut 117 inclined at any desired angle; for example, 30° or 45° angle, to incline the tip 15 and cut the steel plate at the desired angle. As implied from the foregoing descriptive matter, the wheel 27 can be moved upwardly by loosening the wing nut 79 and allow it to be moved upward along the outer wall of the cylinder 25 to keep the desired cutting height of the tip 15 at any desired angle. By use of this angled cutting strut and wheel, the particular angle of cut desired can be more nearly uniformly effected.

Figure 9:
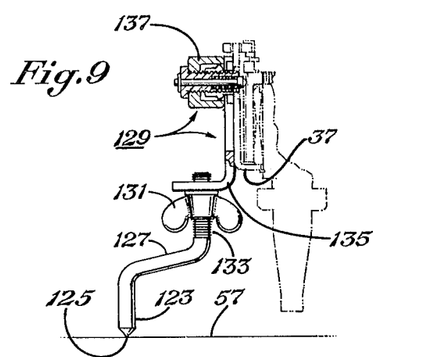
FIG. 9 is a diagrammatic view of a small circle cutting attachment for the embodiment of FIG. 1.

A small circle cutting attachment for the motorized hand torch 11 is illustrated in FIG. 9. Therein, the drive wheel (not shown) can be removed or elevated to a stored position so that it does not engage the steel plate. The small circle cutting attachment comprises a pivot anchor 123 for engaging the steel plate. The pivot anchor has a central point 125 and a radial arm 127 intermediate the pivotal anchor central point and an attachment 129. The attachment 129 can be in one of a plurality of form. As illustrated, it comprises a wing nut 131 and threaded sector 133 for adjusting height, as well as a bracket 135 that is connected with suitable bracket attachment knob 137. The bracket attachment knob will be inserted in the aperture 107, FIG. 5. Thus, the torch tip will rotate about the central point as the cylinder 25 is driven in rotation. Specifically, as illustrated, the radial arm may be varied in length by the relative angle at which the radial arm portion 127 is attached to the bracket 37, as by loosening the wing nut 131 and tightening it back when the desired angle and distance, or length of the radial arm, is effected between central point 125 and the torch tip 15.

A large circle cutting attachment is also provided for the motorized hand torch 11, as can be seen in FIG. 10. Therein, the large circle cutting attachment comprises a magnetic anchor 137 for affixing to the steel plate 57; a pivotally moveable base 139 pivotally carried by the magnetic anchor at its center with its center of rotation coincident with the anchor axis; and a radial arm 141 adjustably connected with the pivotally moveable base 139 and connected its outer end with attachment member 143. The attachment member 143 is connected with the bracket 37, as by way of the knurled knob 109.

The magnetic anchor is preferably a conventional magnet. The high efficiency magnets such as the nickel alloy magnets can be employed, but they tend to lose their magnetic properties dramatically in the presence of high heat such as near the cutting torch. Consequently, the magnetic anchor is preferably conventional type cast magnets.

The pivotal base is simply inserted into a central aperture so that it is centrally disposed within the magnetic anchor and free to turn therewithin. If desired, lubricant can be employed. There should be relatively close tolerance so that very little play, or lateral movement, is allowed. As illustrated, the pivotally mounted base 139 also has a threaded aperture to receive the bolt 145 for holding a predetermined length along the radial arm 141. The radial arm 141 can comprise any suitable rod. As illustrated, it is a cylindrical rod to facilitate movement of the pivotal base 139 therealong and tightening of the said screw, or bolt 145, to hold a desired radial length between the central axis on the magnetic anchor and the torch tip 15. If the desired, the rod may be indexed with distance marks to facilitate setting a desired radius.

The radial arm 141 may be connected with the attachment member 143 by any means, as by welding or the like. On the other hand, it can be screwed thereinto threaded aperture and have shoulders against the member 143. In any event, the two are connected in essentially a unitary configuration. The wheel 27 will drive at about 90° with respect to the radial arm so as to rotate the torch tip 15 in a large diameter circle about the magnetic anchor 137. The attachment member 143 may comprise any form although a simple stamped metallic piece or other piece of suitable structural strength, can be employed to keep the radius of the circles substantially constant as the tip is moved about the magnetic anchor 137.

In operation, the motorized hand torch 11 is assembled and the controls and electric motor connected as described explicitly and implicity hereinbefore. The motor 29 drives the transmission means 31, rotating the cylinder 25. The drive wheel 27 which engages the outer wall of the cylinder 25, drives along a predetermined path if the bracket 37 is set in a fixed alignment by the retention thumbscrew 111. If, on the other hand, the angle strut and wheel 105 is set at a desired angle, the torch tip will be inclined at a desired angle and a cut will be made at the desired angle. Similarly, if a small circle cutting attachment is connected and the drive wheel moved out of engagement with the steel plate 57, the tip will be moved about the central point 25 in a small circle, cutting the desired circle of plate. Height can be adjusted by the wing nut 131 along with threaded section 133 as described hereinbefore.

If, on the other hand, a large circle is to be cut, the large circle cutting attachment of FIG. 10 is employed and the magnetic base attached to the bracket 37 through the interconnecting members and the desired radial arm length. Thus the drive wheel 27 will drive substantially perpendicularly to the radial arm 141 and move the tip 15 in a circle about the anchor 137.

As indicated hereinbefore, the speed of the motor can be varied by a suitable control, such as a rheostat on the control means 33, FIG. 6, separate from or connected with the cutting oxygen handle 21. Once the desired speed is obtained, an on/off switch can be employed instead of the rheostat if desired. When the cut is completed, the motor is de-energized by either the rheostat or a suitable switch. The torch can then be elevated and flame extinguished in conventional means.

By means of this invention, a steady, less tiring type cut can be made that is more nearly uniform regardless of the skill of the operator than the prior art type approaches. This torch allows adjusting the height of the tip by movement of the drive wheel 27 along the peripheral outer wall of the cylinder 25. It allows keeping the motor 29 away from the heat such that it can be mounted remotely from the tip and the lateral shaft 85 connected to drive the cylinder 25.

Of course, other drive means such as a flexible shaft could be employed.

From the foregoing it can be seen that this invention achieves all of the objects delineated hereinbefore and specifically allows cutting by an operator with one hand to obtain more nearly uniform cutting whether in a large or small circle, at angles or the like.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A gas cutting machine for cutting steel plate or the like comprising:

a. a device head having a cutting torch tip;

b. respective conduit means for supplying to said tip, respectively, preheat oxygen, cutting oxygen and fuel gas;

c. a drive cylinder journalled for rotation about said head; said drive cylinder having appreciable height so that a drive wheel can be moved upwardly and downwardly while engaging its peripherally outer cylinder wall;

d. a drive wheel engaging the peripherally outer cylindrical wall of said drive cylinder so as to be driven thereby and moveable longitudinally therealong so as to allow adjustment in height of said tip with respect to said steel plate to allow cutting at a desired angle;

e. a motor;

f. a power transmission means connected with said motor and drivingly connected with said drive cylinder so as to drive said cylinder responsive to said motor;

g. control means for controlling said motor;

h. bracket connected with said housing and supporting said drive wheel adjacent said tip; said bracket being adapted to be affixed such that said drive wheel drives in a straight line; and being adapted to be loose so as to rotate in a full 360° circle about said tip.

2. The gas cutting machine of claim 1 wherein said power transmission means comprises:

a. a first gear disposed on said drive cylinder and connected therewith so as to rotate said drive cylinder when said gear is rotated;

b. a drive gear engaging said first gear;

c. a longitudinal shaft connected to said drive gear and extending longitudinally of said head away from said tip;

d. a lateral shaft extending laterally from said longitudinal shaft and connected with said motor; and e. coengaging bevelling gears connected respectively with said longitudinal shaft and said lateral shaft.

3. The gas cutting machine of claim 1 wherein an angle cutting means is included; said angle cutting means comprising:

a. a second wheel;

b. angled struts supporting said second wheel; and c. adjustable bracket holding said angled strut and adjustable in height so as to enable inclining said tip at a desired angle with respect to the plate and still maintain the proper cutting height between said tip and said plate.

4. The gas cutting machine of claim 1 wherein a small circle cutting attachment is included; wherein said drive wheel can be removed or elevated so that it does not engage said steel plate; said small circle cutting attachment comprising:

a. a pivot anchor for engaging said steel plate; said pivot anchor having a central point and a radial arm intermediate said pivotal anchor central point and an attachment; and b. attachment for connected said pivot anchor and radial arm with said bracket and with said drive cylinder such that said tip will move in a circle of radius substantially equal to said radial arm about said pivot anchor central point.

5. The gas cutting machine of claim 4 wherein said radial arm is connected with a cylindrically shaped central rod that is connected to said bracket and an effective radial arm shorter than said radial arm is effected by adjusting an angle at which said radial arm is affixed to said bracket.

6. The gas cutting machine of claim 4 wherein said bracket can be adjusted in height along said cylindrical member to which said radial arm is affixed for properly adjusting the height of said tip, in addition to adjusting the effective radial arm length between said central point of said pivot anchor and said torch tip.

7. The gas cutting machine of claim 1 wherein a large circle attachment is included; said large circle cutting attachment comprising:

a. a magnetic anchor for attaching to said plate; said magnetic anchor having an anchor axis;

b. pivotally moveable base pivotally carried by said magnetic anchor with its center of rotation at said anchor axis;

c. radial arm adjustably connected with said pivotally moveable base and connected at its outer end with said bracket; and d. attachment member connected with said bracket and adapted to connect said radial arm perpendicular to said drive wheel such that said wheel moves said torch tip about said magnetic anchor.

8. The gas cutting machine of claim 1 wherein said drive cylinder has a serrated outer wall and said drive wheel has serrations engaging it said serrated out wall; said drive wheel having a second portion having serrations along its peripheral outermost edge for engaging said steel plate with greater traction.

9. The gas cutting machine of claim 1 wherein there is also provided a housing covering said device head, motor and power transmission means.

* * * * *

UNITED STATES PATENT AND TRADEMARK OFFICE
CERTIFICATE OF CORRECTION

PATENT NO. : 4,469,311

DATED : September 4, 1984

INVENTOR(S) : David A. Laing

It is certified that error appears in the above-identified patent and that said Letters Patent are hereby corrected as shown below:

Col. 1, line 25 "were" is changed to --was--; col. 3 line 24 "casing" is changed to --housing--; col. 3, line 57, "tortious" is changed to --tortuous--; col. 4, line 46, "25" is changed to --55--; col. 4, line 58, "25" is changed to --15--; col. 5, line 39, "beveled" should be changed to --bevel--; col. 5, line 44, --teeth of-- are inserted before "gear", and "teeth" is deleted after "gear"; col. 6, after line 26 and before line 27, please insert --rotation of the bracket 37--; col. 7, line 11, "pivotal" is changed to --pivot--; col. 7, line 16, the numeral "137" is changed the numeral --136--; in the drawing Fig. 9, the numeral "137" is changed to the numeral --136--; col. 8, line 8, "implicity" is changed --implicitly--; clm. 1, col. 9, line 22, after "said", "housing" is deleted and --device

UNITED STATES PATENT AND TRADEMARK OFFICE
CERTIFICATE OF CORRECTION

PATENT NO. : 4,469,311

DATED : September 4, 1984

INVENTOR(S) : David A. Laing

It is certified that error appears in the above-identified patent and that said Letters Patent are hereby corrected as shown below:

head-- is substituted therefore; clm. 3, col. 9, line 47 "strut" is changed to --struts--; clm. 4, col. 10, line 8, "pivotal" is changed to --pivot--; clm. 4, col. 10, line 10 "means" is inserted after "attachment", and "connected" is changed to --connecting--.

Signed and Sealed this

Fourteenth Day of May 1985

[SEAL]

*Attest:*

DONALD J. QUIGG

*Attesting Officer*  *Acting Commissioner of Patents and Trademarks*